United States Patent [19]

Hyman

[11] Patent Number: 4,610,519

[45] Date of Patent: Sep. 9, 1986

[54] EYEGLASS ASSEMBLY

[76] Inventor: Roger L. Hyman, 5249 N. 35 St., Milwaukee, Wis. 53209

[21] Appl. No.: 691,283

[22] Filed: Jan. 14, 1985

[51] Int. Cl.<sup>4</sup> ............................................. G02C 1/00
[52] U.S. Cl. ...................................... 351/86; 351/63; 351/107; 351/59; 351/124
[58] Field of Search ................... 351/86, 88, 123, 120, 351/97, 107, 59, 63, 124, 133, 149

[56] References Cited

U.S. PATENT DOCUMENTS

D. 147,168  7/1947  Villanueva ............................ 351/63
2,752,819  7/1956  Krukowski ........................... 351/107

Primary Examiner—Rodney B. Bovernick
Assistant Examiner—P. M. Dzierzynski
Attorney, Agent, or Firm—Andrus, Sceales, Starke & Sawall

[57] ABSTRACT

An eyeglass assembly includes first and second lens holding frames, each of which has a temple piece pivotally attached to and extending rearwardly from an edge portion of the frame. The first and second frames are releasably and pivotally connected to each other in an overlapping manner and the snap connector use to join the frames is disposed within recesses in the frames so that when the frames are connected they will be flush against each other and no portion of the connector will be visible.

5 Claims, 7 Drawing Figures

EYEGLASS ASSEMBLY

BACKGROUND OF THE INVENTION

The present invention relates to an eyeglass assembly and more particularly to a sunglass assembly that permits the interchanging of lens holding frames.

High fashion sunglasses have been marketed that utilize various colors for the lens holding frames and that utilize a variety of geometric shapes for the lens holding frames. These fashion sunglasses are extremely expensive and thus owning a number of pairs in various shapes and colors is prohibitive.

A number of U.S. patents show the use of interchangeable lens holding frames and patents such as U.S. Pat. No. 4,129,362 and Design Pat. No. 147,168 show the use of interconnected and pivoting frame members. However, all of the prior art eyeglasses and sunglasses which utilize interchangeable frames or pivoting frames have exposed connectors and/or pivot points which detract from the asthetics of the eyeglasses and thus are not suitable for high fashion eyeglasses.

It is therefore desirable to provide a pair of high fashion eyeglasses or sunglasses that will have interchangeable frame members so that a number of geometric shapes and/or colors may be combined to provide a unique appearance. It is also desirable to have the interchangeable frame members connected in such a manner that the connector or pivot point is not visible and thus does not detract from the asthetics of the eyeglasses.

SUMMARY OF THE INVENTION

An eyeglass assembly includes first and second lens holding frames, each of which has a temple piece pivotally attached to and extending rearwardly from an edge portion of the frame.

In accordance with one aspect of the invention, the frame members are interconnected in an overlapping manner.

In accordance with another aspect of the invention, the connector portions for joining the frames are disposed within recesses in the frames so that when the frames are joined, they will overlap and be flush against each other. Thus, no portion of the connector will be visible.

In accordance with yet another aspect of the invention, the inner frame of the assembly when the frames are connected in an overlapping fashion includes a curved portion in the nose piece zone which accommodates the nose of the wearer.

In accordance with still another aspect of the invention, the frames are provided with dissimilar geometric shapes.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
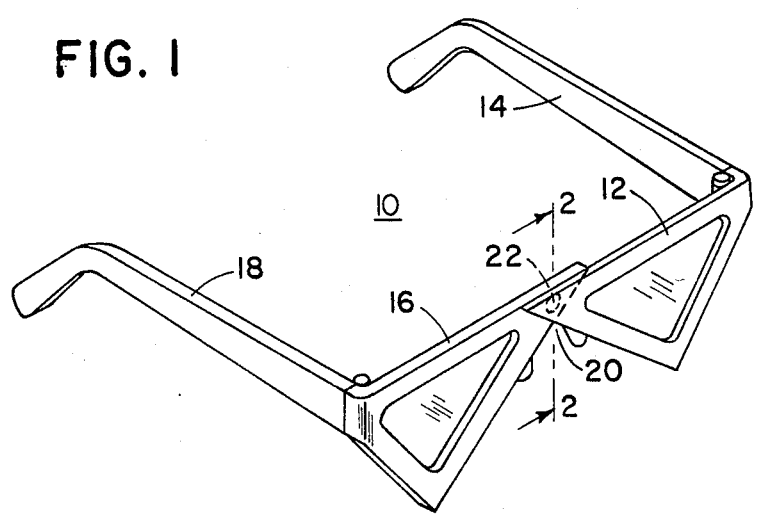
FIG. 1 is a perspective view of a pair of eyeglasses constructed according to the present invention.
Figure 2:
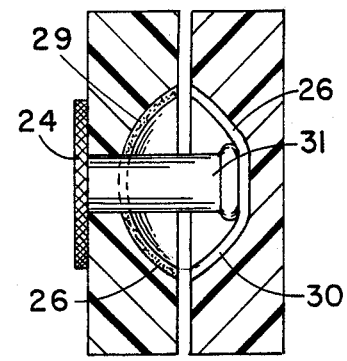
FIG. 2 is a section taken along line 2—2 of FIG. 1.

As seen in FIG. 1, an eyeglass or sunglass assembly 10 consists of a left hand frame member 12 having a temple piece 14 pivotally connected to and extending rearwardly from the outer edge of frame member 12 and a right hand frame member 16 that also has a temple piece 18 pivotally connected and rearwardly extending from an outer edge of frame member 16.

Left and right hand frame members are connected in an overlapping manner in the nose piece zone 20 by means of connector 22 having male and female mating portions 24 and 26. In the preferred embodiment, applicant has utilized snap fasteners made of acetal such as commonly used in infants clothing. In the embodiment shown, right hand frame member 16 is provided with a recess 28 into which the post projecting male portion 24 is disposed and held by means of an adhesive 29, such as an all-purpose glue. Applicant also forsees that the connector portions could be cast as an integral part of the frame member. Similarly, right hand frame member 16 is provided with a recess 30 in which a post receiving socket 26 is disposed. Male and female connector portions 24 and 26 are located within recesses 28 and 30 so that when left hand frame member 12 and right hand frame member 16 are connected, post 31 will be contained in a socket in female portion 26 and the frame members will abut and be flush against each other.

Figure 3:
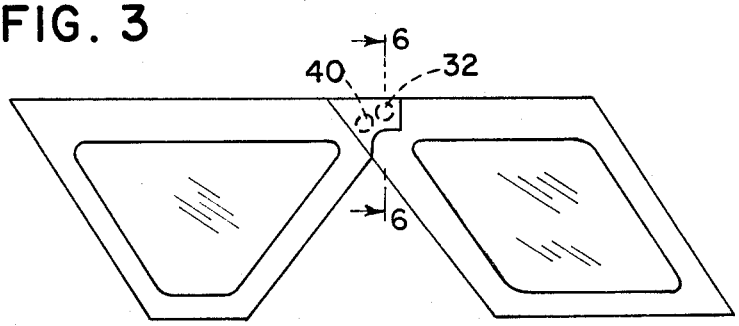
FIG. 3 is a plan view of a pair of eyeglass frames constructed according to the invention and utilizing a locking pin.
Figure 6:
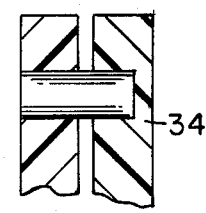
FIG. 6 is a section taken along line 6—6 of FIG. 3.

Connector 22 is of the type that will normally allow pivotal motion between connected frame members 12 and 16. However, since it is possible that pivotal motion may not always be desirable between the frame members, FIG. 3 shows one embodiment of a locking device to prevent pivotal motion between the frame members. In this embodiment, one of the frame members is provided with a locking pin 32, while the other frame member is provided with a pin receiving hole 34. When the frames are joined by means of connector 22 and are positioned for wearing, locking pin 32 is aligned with pin receiving hole 34 and inserted into the hole. The combination of connector 22 and locking pin 32 prevents pivotal motion of the frame members relative to each other.

Figure 4:
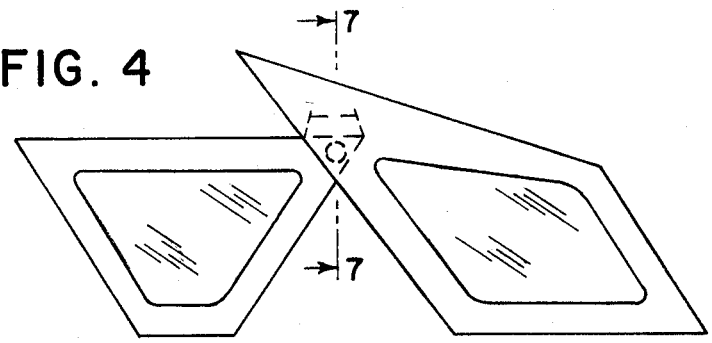
FIG. 4 is a plan view of a pair of eyeglass frames constructed according to the present invention and utilizing a locking notch and recess.
Figure 7:
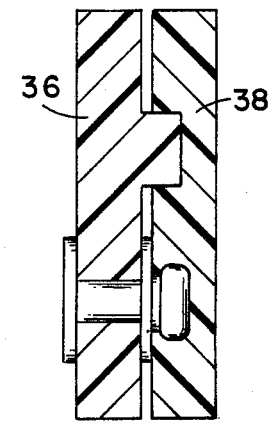
FIG. 7 is a section taken along line 7—7 of FIG. 4.

FIG. 4 and FIG. 7 illustrate an alternate embodiment of the locking device. In this embodiment, one of the frame members is provided with a locking prong 36 which is integrally formed with the frame member and the other frame member is provided with a prong receiving notch 38. When the frame members are connected and are positioned for wearing, prong 36 will mate with notch 38 and prevent pivotal movement of the frames relative to each other.

Figure 5:
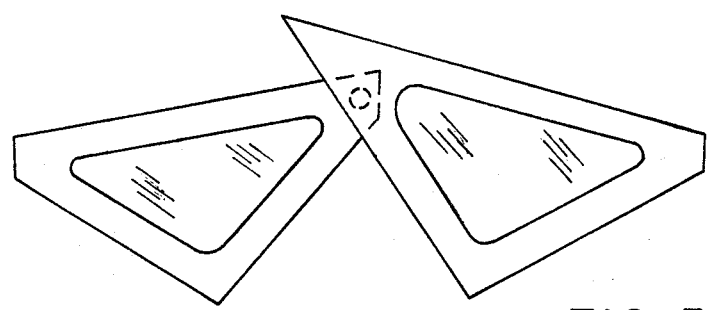
FIG. 5 is a plan view of a pair of frames having dissimilar geometric shapes.

FIG. 5 is illustrative of a pair of frame members having dissimilar geometric shapes joined by means of a connector 22. The present invention thus provides for the joining of either symetric or asymetic lens holding frames in a single eyeglass assembly.

As seen in FIG. 3, the left hand frame member 12 is the inner most frame member. When the frames are connected according to this embodiment, frame member 12 is provided with a curved portion 40 in the nose zone 20 to accomodate the nose of the wearer and add to the comfort of the glasses.

The present invention thus provides an eyeglass assembly having readily interchangeable lens holding frames while providing for the joining of the frames in such a manner that the frames are flush against each other when joined and the connector joining the frames is not visible.

Various modes for carrying out the invention are contemplated as being within the scope of the following claims particularly pointing out and distinctly claiming the subject matter which is regarded as the invention.

I claim:

1. An eyeglass assembly comprising:
    a first lens holding frame having a temple piece pivotally attached to and extending rearwardly from an edge portion of said first frame
    a second lens holding frame having a temple piece pivotally attached to and extending rearwardly from an edge portion of said second frame
    said first and second frames releasably and pivotally connected to each other at a connection point in the nose piece zone in an overlapping manner with one of said frames having a post receiving socket portion of a connector disposed within a recess in the nose piece zone of said frame and the other of said frames having a post projecting portion of the connector disposed within a recess in the nose piece zone of said other frame so that said frame pieces will be flush against each other upon being connected and no portion of the connector will be visible.

2. The eyeglass assembly defined in claim 1 further comprising locking means to prevent pivoting of the frames about the connection point when said eyeglass assembly is being worn.

3. The eyeglass assembly defined in claim 2 wherein said locking means comprises a locking prong projecting from one of said frames and a prong receiving recess in the other of said frames, said prong and recess being disposed on said frames in such a manner that upon connection of said frames said prong engages said recess and prevents the pivoting of said frames about said connection point.

4. The eyeglass assembly defined in claim 1 wherein the inner frame of said assembly when said frames are connected in an overlapping fashion include a curved portion in the nose piece zone to accommodate the nose of the wearer.

5. The eyeglass assembly defined in claim 1 wherein said frames are of dissimilar geometric shapes.

* * * * *